(12) United States Patent
Bailey

(10) Patent No.: US 10,285,393 B2
(45) Date of Patent: May 14, 2019

(54) ARTHROPOD PEST TRAPPING DEVICE, SYSTEM AND METHOD

(71) Applicant: RED BAND TRAPS, LLC, Portland, OR (US)

(72) Inventor: Tristan Vere Bailey, Portland, OR (US)

(73) Assignee: Red Band Traps, LLC, Portland, OR (US)

( * ) Notice: Subject to any disclaimer, the term of this patent is extended or adjusted under 35 U.S.C. 154(b) by 329 days.

(21) Appl. No.: 14/922,048

(22) Filed: Oct. 23, 2015

(65) Prior Publication Data

US 2016/0113264 A1    Apr. 28, 2016

Related U.S. Application Data

(60) Provisional application No. 62/068,411, filed on Oct. 24, 2014.

(51) Int. Cl.
    *A01M 1/14*    (2006.01)
    *A01M 1/10*    (2006.01)
    *A01M 1/02*    (2006.01)

(52) U.S. Cl.
    CPC .............. *A01M 1/103* (2013.01); *A01M 1/02* (2013.01); *A01M 1/14* (2013.01)

(58) Field of Classification Search
    CPC .......... A01M 1/103; A01M 1/06; A01M 1/02; A01M 1/14; A01M 3/04
    See application file for complete search history.

(56) References Cited

U.S. PATENT DOCUMENTS

| | | | | |
|---|---|---|---|---|
| 559,184 | A | * | 4/1896 | Marshall ................ A01M 1/14 43/114 |
| 663,728 | A | * | 12/1900 | Church .................. A01M 1/14 43/114 |
| 790,620 | A | | 5/1905 | Crofford |
| 825,275 | A | | 7/1906 | Laube et al. |
| 844,503 | A | * | 2/1907 | Dittman ................ A01M 1/14 43/114 |
| 919,149 | A | * | 4/1909 | Foster .................... A01M 1/14 43/114 |

(Continued)

FOREIGN PATENT DOCUMENTS

| CN | 101524061 A | 9/2009 |
|---|---|---|
| CN | 102084856 A | 6/2011 |

(Continued)

OTHER PUBLICATIONS

AquaponicsUSA (https://aquaponicsusa.wordpress.com/2013/08/22/the-good-the-bad-and-the-ugly/), published Oct. 7, 2013.*

(Continued)

*Primary Examiner* — Kathleen I Alker
(74) *Attorney, Agent, or Firm* — McCoy Russell LLP

(57) ABSTRACT

The present invention relates to a disposable, cost-efficient, and environment-friendly arthropod trapping device, method and system. In one embodiment, the arthropod trapping device includes a suspension element, an engagement section with a pest immobilizing surface and a contact lead segment. In some examples, the engagement section may include a fill indicator mark to indicate pest accumulation.

9 Claims, 8 Drawing Sheets

(56) References Cited

U.S. PATENT DOCUMENTS

| | | | | |
|---|---|---|---|---|
| 1,097,838 | A | * | 5/1914 | Bendall ................... A01M 1/14 43/115 |
| 1,112,064 | A | * | 9/1914 | Gordon ................... A01M 1/02 43/114 |
| 1,127,310 | A | * | 2/1915 | Suck ........................ A01M 1/14 43/115 |
| 1,318,562 | A | * | 10/1919 | Hughes ................... A01M 1/14 43/115 |
| 1,718,805 | A | | 6/1929 | Wilkie et al. |
| 1,914,022 | A | | 6/1933 | Johnson |
| 2,073,791 | A | * | 3/1937 | Graef ..................... A01M 1/165 43/116 |
| 3,295,246 | A | | 1/1967 | Landsman et al. |
| 3,729,858 | A | | 5/1973 | Bradshaw |
| 3,820,273 | A | | 6/1974 | Novak |
| 3,863,384 | A | | 2/1975 | Weatherston et al. |
| 4,145,836 | A | | 3/1979 | Zeller |
| 4,566,220 | A | | 1/1986 | Justice |
| 4,876,823 | A | | 10/1989 | Brunetti |
| 4,899,485 | A | | 2/1990 | Schneidmiller |
| 4,930,251 | A | | 6/1990 | Crisanti |
| 4,961,282 | A | | 10/1990 | Hoppe |
| 5,005,416 | A | | 4/1991 | Vick et al. |
| 5,048,224 | A | * | 9/1991 | Frisch ..................... A01M 1/02 43/107 |
| 5,244,906 | A | | 9/1993 | Dick et al. |
| 5,253,448 | A | | 10/1993 | Byom |
| 5,325,625 | A | | 7/1994 | Liu et al. |
| 5,383,301 | A | | 1/1995 | Babb |
| 5,461,822 | A | | 10/1995 | Green et al. |
| 5,536,501 | A | | 7/1996 | Emerson et al. |
| 5,649,385 | A | | 7/1997 | Acevedo |
| 5,737,870 | A | | 4/1998 | Thind |
| 5,839,224 | A | | 11/1998 | Emerson et al. |
| 6,155,002 | A | * | 12/2000 | Holder ..................... A01M 1/14 43/114 |
| 6,161,327 | A | * | 12/2000 | Thomas ................. A01M 1/145 43/114 |
| 6,178,687 | B1 | * | 1/2001 | Frisch ..................... A01M 1/14 43/114 |
| 6,463,878 | B1 | * | 10/2002 | Moody ............. A01K 39/0113 119/52.3 |
| 6,505,434 | B1 | | 1/2003 | Kloczko et al. |
| 6,516,558 | B1 | * | 2/2003 | Lingren ................... A01M 1/02 43/107 |
| 6,574,914 | B2 | | 6/2003 | Smith |
| 6,625,922 | B1 | | 9/2003 | Ernsberger, IV |
| 7,676,985 | B1 | | 3/2010 | Perkins |
| 7,793,461 | B2 | * | 9/2010 | Klein ....................... A01M 1/14 119/72 |
| 8,079,175 | B2 | | 12/2011 | Calkins et al. |
| 8,151,515 | B2 | | 4/2012 | Crouse et al. |
| 8,448,376 | B2 | * | 5/2013 | Kagawa ................. A01M 1/106 43/107 |
| 8,793,927 | B2 | * | 8/2014 | Winkler ................... A01M 1/14 43/107 |
| 2002/0076427 | A1 | | 6/2002 | Hurwitz |
| 2004/0074138 | A1 | * | 4/2004 | Moreira ................. A01M 1/026 43/107 |
| 2006/0086039 | A1 | | 4/2006 | Israely et al. |
| 2006/0225338 | A1 | | 10/2006 | Mursic et al. |
| 2006/0283076 | A1 | | 12/2006 | Chambers et al. |
| 2007/0094915 | A1 | * | 5/2007 | Plato ....................... A01M 1/02 43/114 |
| 2008/0115406 | A1 | | 5/2008 | Duston et al. |
| 2011/0099885 | A1 | | 5/2011 | Maganga |
| 2012/0055075 | A1 | * | 3/2012 | Winkler ................... A01M 1/02 43/114 |
| 2013/0295153 | A1 | | 11/2013 | Miresmailli et al. |

FOREIGN PATENT DOCUMENTS

| | | | | |
|---|---|---|---|---|
| EP | | 2491786 A1 | 8/2012 | |
| JP | | 588278 U | * 12/1993 | .............. A01M 1/16 |
| JP | | 3602641 B2 | * 12/2004 | .............. A01M 1/02 |

OTHER PUBLICATIONS

Benfried (http://www.benfried.com/en/gardeners/biological-crop-control/sticky-traps-and-roller-traps/), published Aug. 12, 2014.*

"Mite-y Genomic Resources for Bioenergy Crop Protection," Joint Genome Institute of the United States Department of Energy Press Release, Available Online at http://jgi.doe.gov/news_11_11_23/, Nov. 23, 2011, 3 pages.

"Tangle-Trap Insect Trap Coating Paste Formula," Safety Data Sheet, CONTECH, Jul. 7, 2014, 4 pages.

"Tree Tanglefoot Insect Barrier," Safety Data Sheet, CONTECH, Jul. 7, 2014, 5 pages.

* cited by examiner

FIG. 3A

ARTHROPOD PEST TRAPPING DEVICE, SYSTEM AND METHOD

CROSS-REFERENCE TO RELATED APPLICATIONS

The present application claims priority to U.S. Provisional Patent Application No. 62/068,411, entitled "INSECT TRAPPING DEVICE, SYSTEM AND METHOD," filed Oct. 24, 2014, the entire contents of which are hereby incorporated by reference for all purposes.

FIELD OF THE INVENTION

This invention relates to an arthropod pest trapping device, system and method, and specifically to a device, system and method to bait and trap crawling arthropods, specifically, arachnids, such as spider mites, that cause plant destruction.

BACKGROUND/SUMMARY

Common flightless agricultural pests cause significant damage to plants and reduce growers' ability to provide agricultural commodities to the market. These agricultural pests may include a number of different types of arthropods, including insects and arachnids. Flightless pests, such as spider mites, aphids, thrips, and such others, feed on plants, primarily affecting leaves, buds, flowers, and stem areas. These pests may attack a plant differently. For example, aphids prevalently attack stem areas and areas between leaves and stems, while spider mites, primarily affect leaves, puncturing leaf veins and feeding on the sap.

As an example, spider mites, members of the acari subclass of the arachnida class, are a known agricultural pest for a number of crops, including, but not limited to: maize, tomatoes, cannabis, peppers, strawberries, soybeans, raspberries, etc.

Specifically, spider mites are known to have one of the most harmful economic effects in agriculture on some flowering plants or angiosperms, attacking and feeding on the plants leaves and forming colonization webs in areas between leaves and under the leaves. Additionally spider mites may be active throughout the growing season, feeding on leaves and buds and affecting plant health and overall yield.

For example, spider mites may invade leaf surfaces of vegetable plants, such as tomato plants, hemp plants, or other leafy plants. The spider mite colonization can severely affect the plants growth and health.

Further, spider mites are known to affect both upper and lower surfaces of leaves of fruit plants, such as raspberry and strawberry plants. Exhaustive feeding by spider mites produce yellow spots on upper surfaces of leaves and webbing on lower surfaces of leaves of raspberry plants. As spider mite populations expand the affected leaves may necrotize and fall off the plant.

Additionally, spider mites may also attack leaves of maize plants. Spider mites may damage maize plants by affecting the leaves and the leafy husk surrounding the maize ears. Several studies have documented huge economic loss to the maize growing agricultural sector by spider mites. Similarly, spider mites are known to attack leaves of pepper plants, affecting produce yield and causing economic loss to farmers and individual growers.

Intensive spider mite attacks reduce plant vigor and may cause leaves to be mottled, turning brown and dropping prematurely. Damage may spread from small patches on an individual plant to a group of plants to the entire plantation.

One conventional method used by many growers to combat crop loss is the spraying of pesticides, including insecticides or miticides. Spraying pesticides may cause environmental pollution and prove to be harmful to humans and other animals. Additionally, long term use of pesticides may trigger emergence of pesticide-resistant pest species, rendering the pesticide ineffective. Further, pesticides are often sprayed over a large area, and use of pesticides may lead to affecting non-target organisms, such as beneficial ladybug species and pollinators, such as bees.

The inventor herein recognized the above problems and discloses herein a pest trapping device including a suspension element and an engagement section, to trap pest arthropods, primarily crawling pest arthropods, such as spider mites, from crops and plants thereby reducing agricultural and economic damage. Although described in regards to arachnids, and specifically spider mites, the arthropod pest trapping device could be used with any number of arthropods, including insects, such as crawling insects.

In one approach, the engagement section may include a pest immobilization or pest immobilizing surface. The adhesive, non-drying and viscous nature of the pest immobilization surface may retard and adhere minute crawling pest arthropods. As described in detail below, in some embodiments, the organic nature of the contact substance may be advantageous in providing a non-toxic, environment friendly method to combat specific pest populations. Additionally, a contact lead segment may provide an arachnid pathway and allows for mobility and flexibility of using the trap. In one approach, the arachnid trap may include a fill indicator mark to indicate the level of accumulated pests. In some examples, the fill indicator mark on the pest immobilization surface may include graduated markings to help the grower quantify and estimate pest piling or population level and help track the degree of infestation in the affected plants. Such quantification may also suggest to the grower if additional pest trapping devices need to be added or replaced for enhanced protection of the affected plants. Hence, such pest trapping devices may be cost efficient; easy to assemble and deploy; easy to identify for replacement; fast and easy to remove entirely; and environmentally friendly.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A-D show additional embodiments of the present disclosure;

DETAILED DESCRIPTION

Figure 1:
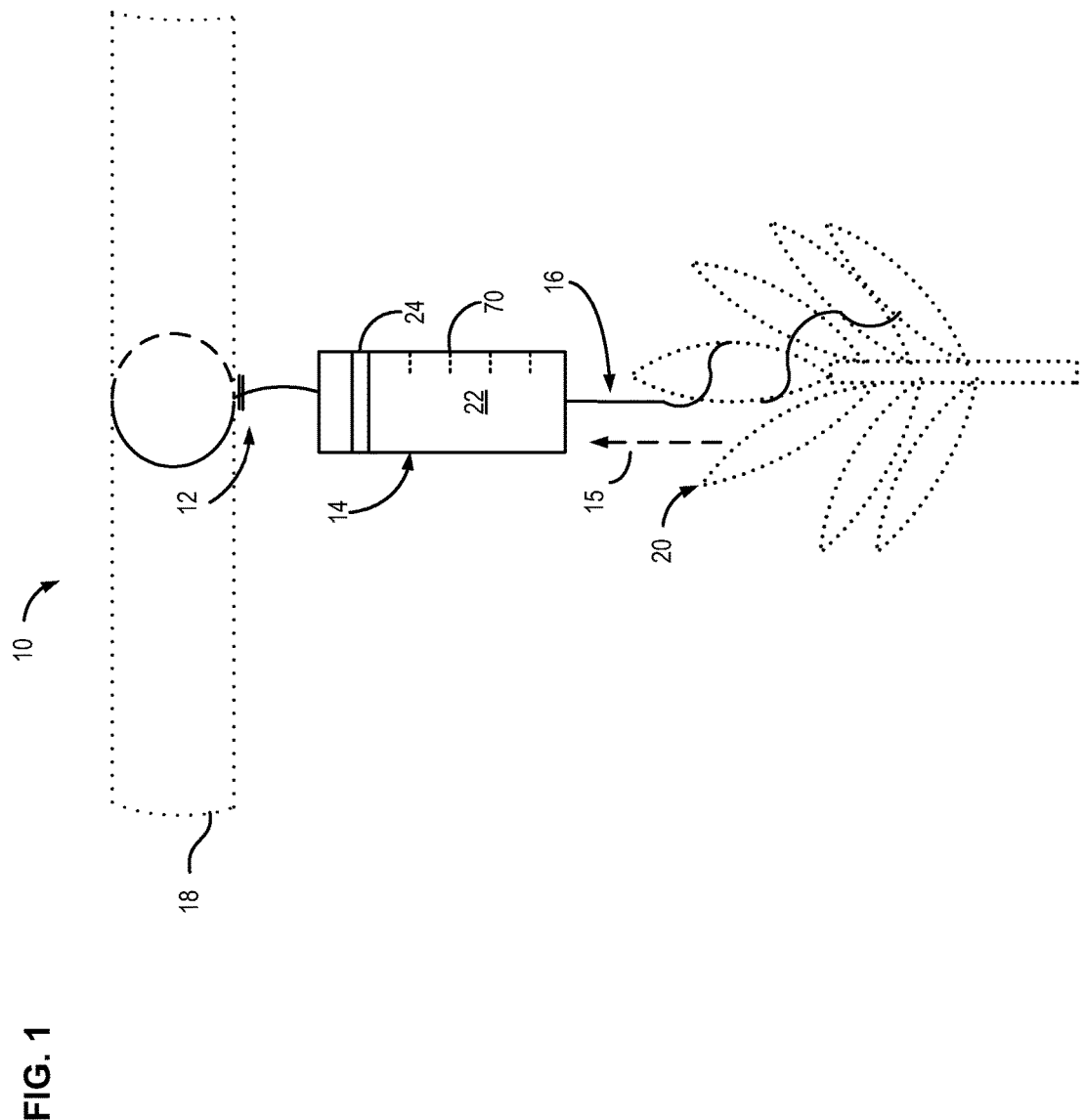
FIG. 1 is a perspective view of an example embodiment of an pest trapping device of the present disclosure.

The present description relates to an arachnid trapping device 10 configured to trap arthropods, particularly crawling arthropods, such as spider mites, thrips, aphids, and such others, feeding on leaves, flowers, buds or fruits of plants. Although described in regards to arachnids, and specifically spider mites, the arachnid trapping device could be used with any number of arthropods, including insects, such as crawling insects. Thus, it should be understood that this disclosure is directed to arthropod pests which commonly crawl and which exhibit similar predation patterns. Pests, as used herein, may include any suitable arthropod pest.

As detailed above, spider mites, in particular, are known to be common pests on many plants around yards and gardens. Generally, spider mites are considered to be medium-sized mites that feed on a wide variety of host plants from many different plant families. For example, Spider mites attack a wide range of flowering or seed-generating plants, including garden plants, ornamental plants, medicinal plants, vegetable plants such as, tomatoes, peppers and maize, and fruit plants such as, raspberries, currants and pears. As provided by the United States Department of Energy Joint Genome Institute, Mite-y Genomic Resources for Bioenergy Crop Protection, "The cost of chemically controlling spider mites to counteract reduced harvest yields hovers around $1 billion annually, reflecting their significant economic impact." (Report of Nov. 23, 2011).

As a specific example, two-spotted spider mite or *Tetranychus urticae*, are a common type of spider mite that infests such plants. *Tetranychus urticae* represent one of the most polyphagous arthropod herbivores, feeding on more than 1100 plant species belonging to more than 140 different plant families, including species known to produce toxic compounds. *Tetranychus urticae* are known as a major pest in greenhouse production and field crops, destroying annual and perennial crops, such as tomatoes, peppers, cucumbers, strawberries, maize, soy, apples, grapes and citrus. Specifically, the *Tetranychus* species are known to colonize and affect leaves of such plants, including tomatoes, maize and raspberry plants, for example. Such attacks may be prevalent during growing seasons and in year round environments where temperatures rarely go below 60 degrees F. Further, the *Tetranychus* species may remain active in drought conditions. The activities of the *Tetranychus* species may add up to huge economic loss for individual growers and farmers of affected plants. In further examples, spider mites may affect other plant types, for example the spruce spider mite or *Oligonychus ununguis* on spruce and juniper, *Oligonychus subnudus* on pines, and *Platytetranychus libocedri* on arborvitae and juniper may also suffer from infestation and immature plants may be vulnerable.

Spider mites are small and often difficult to see with the unaided eye. For example, an adult female spider mite may be approximately 0.4 mm in length. Their colors range from red and brown to yellow and green, depending on the species of spider mite. Additionally, seasonal changes affect appearance of spider mites. Spider mites infest and damage the plants by puncturing the plant cells with their mouthparts and ingesting the sap. Damaged areas typically appear marked with many small, light flecks, giving the plant a speckled appearance.

As described in more detail below and to address such infestations, the arachnid trapping device 10 herein comprises a suspension element 12; an engagement section 14; and a contact lead segment 16. In accordance with an example embodiment of the present invention, the suspension element 12 may be coupled to a support element 18 such that the arachnid trapping device is selectively positioned. The contact lead segment 16 may be configured to engage a plant 20. For example, in some embodiments, the contact lead segment may wrap or swirl around a plant, such as the top branches or limbs of the plant. Spider mites, present on the leaves and stem of the plant, such as, for example, a raspberry plant, apple or almond tree branch, soybean plant, cucumber and maize, may utilize the contact lead segment as part of the plant and may move or crawl along the contact lead segment to the engagement section.

The engagement section may include a pest immobilization surface 22, such that the engagement section may be partially or fully coated with an adhesive. Spider mites, or other similar arthropods, may become stuck on the pest immobilization surface 22. As more spider mites continue to crawl along contact lead segment 16 to engagement section 14, the spider mites continue to crawl upward over those spider mites which are already stuck to the pest immobilization surface filling the engagement section from bottom edge upwards.

FIG. 1 illustrates a first example embodiment of the arachnid trapping device 10. FIGS. 2 A-D illustrate arrangement of the various components of the pest trapping device 10. FIGS. 3A-D show further example embodiments of the pest trapping device of the present invention.

As briefly described above, in FIG. 1, pest trapping device 10 includes a suspension element 12. Suspension element 12 may be any suitable hanging device or positioning device. For example, suspension element 12 may be configured to hang from a support element 18 over a plant 20. Suspension element 12 may be coupled, either directly or indirectly to the support element. In one example, suspension element 12 may be connected directly to the support element or looped or otherwise coupled to the support element such that the hanging element is selectively positioned relative to a plant.

Support element 18 may be a rod, a pole, a wire, a bar, a string or other support mechanism. In some embodiments, support element 18 may be selectively positioned over a row of plants, such as a pole or wire passing over a plant row or rows. The support element may extend above the top plant surface providing a hanging space between the support element 18 and the plant 20 for the pest trapping device, specifically the engagement section 14 of the pest trapping device. The hanging space may vary depending on the size of the engagement section and/or the contact lead segment. In some examples, an adjustment element (such as a looped string) may be provided such that the position of the pest trapping device may be altered as the plant grows.

In some examples, the support element may be positioned such that there is no direct contact between the support element 18 and the plant 20. As described briefly above, the height of the support element and the hanging space may be adjusted with respect to the level of the plant. For example, a wooden shaft may be used as the support element and depending on the height of the plant; the height of the shaft from the ground may be optimized. Alternatively, in some examples, the adjustment element may be used to optimize the hanging space.

The hanging space is of sufficient size to prevent the engagement section (described in more detail below) of the pest trapping device from directly contacting the plant. By preventing direct contact of the engagement section and the pest immobilization surface with the plant it is possible to reduce the opportunity for the pests to escape and avoid damage to the plant due to the adhesive nature of the mucilage on the engagement section. Instead, the contact lead segment which is configured to extend downward to contact or fold into the plant top provides the pathway 15 for the arthropods to reach the engagement section.

It should be appreciated that plant 20 may be any suitable plant that may be infested or have undesirable minute or tiny crawling pests, such as, but not limited to, spider mites. For purposes of illustration, and not as a limitation, plants infested by crawling pests may include green leafy plants, including, crops, medicinal plants, inside and outside plants, vegetable plants, and others. For example, such plants may include, but are not limited to: maize and maize hybrid plants, tomato plants, fruit plants, cannabis or hemp plants, peppers, raspberries, strawberries, soybeans, etc.

Suspension element 12 may be coupled to an engagement section 14. Engagement section 14 may include a pest immobilization surface 22. For example, and described in more detail below, a body of the engagement section 14 may be partially or fully coated with adhesive or contact substance. In some examples, engagement section 14 may have a first and second surface, such as a front and back surface, both surfaces covered with adhesive. The engagement section may further have side surfaces covered with adhesive. One or more engagement elements may form the body of engagement section 14.

A fill indicator mark 24, also referred to herein as an indicator mark, may be positioned on the engagement section to indicate a fill line. Coverage or contact of pests of the indicator mark may indicate time for replacement of the pest trapping device and/or the engagement section 14. The indicator mark may be a line extending around the body of the engagement section or may be any other mark, such as a color or pattern difference, to indicate a fill level.

Extending from engagement section 14 is a contact lead segment 16. Contact lead segment may form a pathway for the arthropods, referred to herein as the arachnid or pest pathway, from plant 20 to engagement section 14 of the pest trapping device. The lead segment may extend downward from the engagement section to one or more plant contact positions. In some examples, the lead segment may be wrapped, draped or otherwise arranged such that the pest pathway is continuous from the plant to the engagement section. The pest pathway may include an upwardly extending portion such that the pests travel upwards above the plant to the engagement section.

The vertical orientation of the pest trapping device and pest pathway takes advantage of the natural activity of certain arachnids, such as spider mites. Specifically, spider mites seek to colonize the shoot and inflorescence apical meristems of host plants. Shoot and inflorescence meristems occur at the tops and budding ends of stems. By providing a pest pathway that extends beyond the plant from where said meristems occurred, the pest pathway acts as a "lure" for the pests and the individual pest follows its instincts to where the best habitat generally is—the top of the plant. The contact lead segment acts as a false extension of the plant, providing the colonizing pests with a continued upward pathway to the trap's sticky, engagement section.

The contact lead segment 16 may be any suitable material which provides at least one crawlable pathway for the arthropods. In some examples, the contact lead segment may be constructed from one or more fibers. The fibers may be natural or man-made fibers or combinations thereof. Further, in some examples, the lead segment may be a plastic or other material which provides the crawlable pathway from the plant upward to the engagement section.

For example, the lead segment may be formed from natural biodegradable fibers, such, as but not limited to, cotton, hemp, sisal, and other similar fibers. In some embodiments, natural fibers may impart advantages of being biodegradable and be treated as environment friendly. Additionally, texture of the natural fibers may help provide pathway traction for crawling arthropods.

As another example, the lead segment may be or include a man-made material, such as, but not limited to, polyesters and nylon. In some examples, the lead segment material may have a surface treatment to enable traction for the pests in variable environmental conditions, including rain. The lead segment may be further coated or otherwise treated to provide durability in use during environmental condition changes, e.g. weather changes.

As an example and not as a limitation, in one example, the length of the pest trapping device 10 may range between 15-20 inches. The contact lead segment may be of any suitable size to provide the crawling path. In one example, the contact lead segment may be a string with a thickness of approximately 1 mm, although in other examples the contact lead segment may be 0.75 mm-1.5 mm or $\frac{1}{32}$" to $\frac{1}{16}$". Other sizes outside these ranges are further considered and operatively form the desired crawling path and are within the scope of the disclosure. The length of the contact lead segment 16 may vary depending on the amount of entanglement required or desired and may depend on the type of crop or leaves or environmental factors such as high average wind speed. For example, the contact lead segment may be wrapped around more than one affected area of a plant. As another example, the contact lead segment may be hung over more than one plant or split between plants. Further, in some examples, the thickness of the lead segment may vary over the length or may vary between branches/splits of the lead segment. It should be appreciated that other lengths and thicknesses may be used without departing from the scope of the invention.

It should be appreciated that although a single contact lead segment is illustrated, two or more contact lead segments may extend from engagement section 14. Further, multiple contact lead segments may be used on one or more plants. Similarly, the contact lead segment may include one or more branches which may be of different lengths to contact different parts of one or more plants.

Figure 2A:
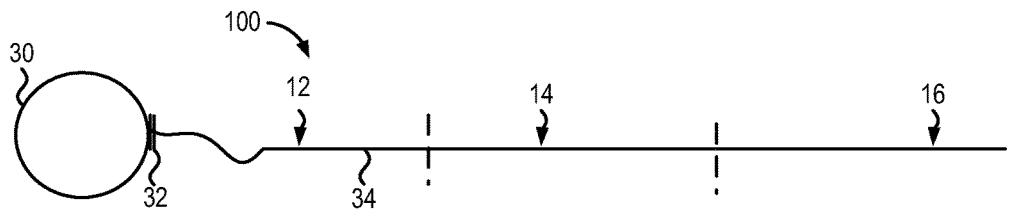
FIG. 2A illustrates another example of the pest trapping device of the present disclosure.

Referring now to FIGS. 2A-D, an example pest trapping device 100 is described in more detail. Referring to FIG. 2A, a three-part configuration is illustrated, including a suspension element 12, engagement section 14, and a contact lead segment 16. In some examples, a continuous fiber may form the suspension element, engagement section and contact lead segment.

In the illustrated example, suspension element 12 may include a loop 30. The loop 30 may be secured with a non-slip knot 32, such as a bowline knot, a girth hitch knot, a butterfly knot, an eight loop knot, and such other loop-securing knots. Diameter of the loop 30 may be configured such that a support element may pass through the loop. Extending from loop 30 is tail 34 which may be coupled with engagement section 14.

Figure 3A:
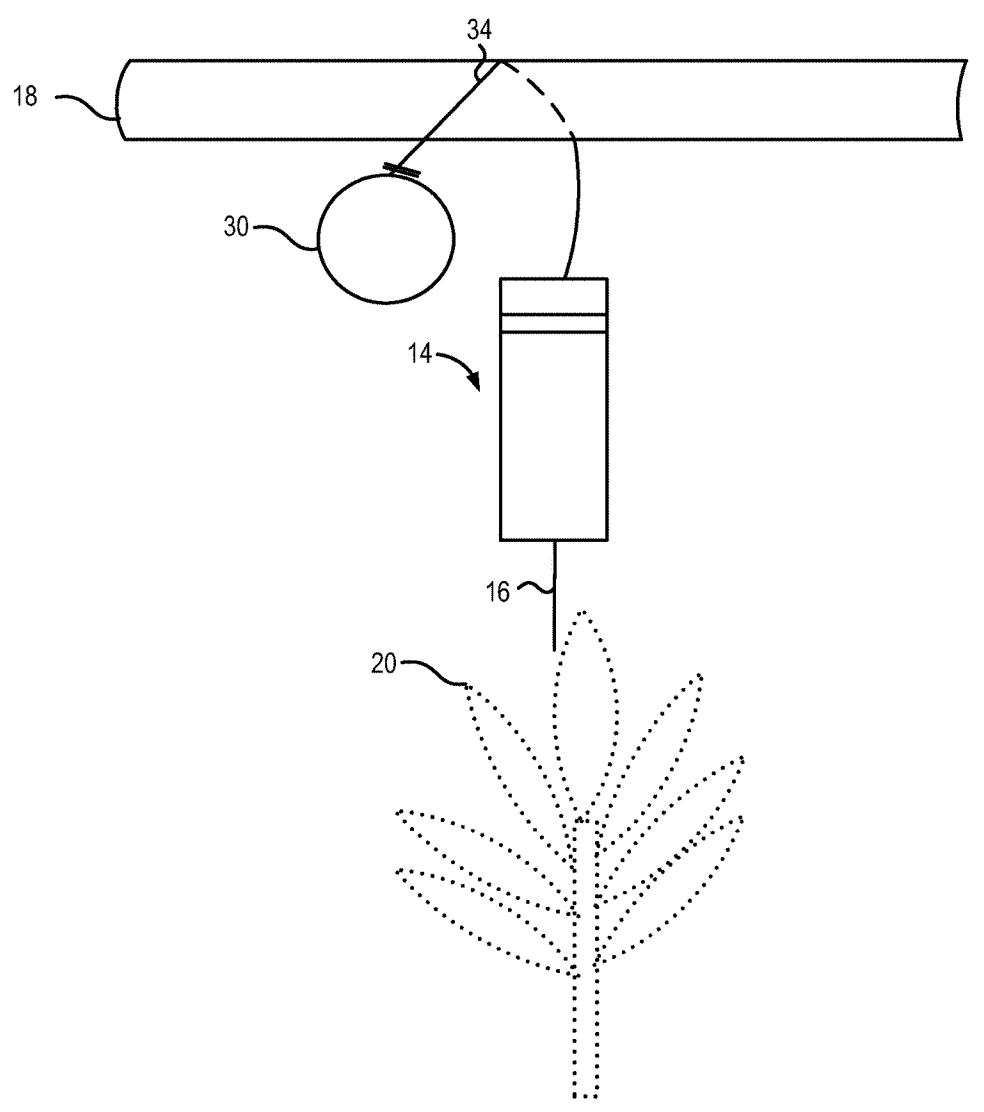
Figure 3B:
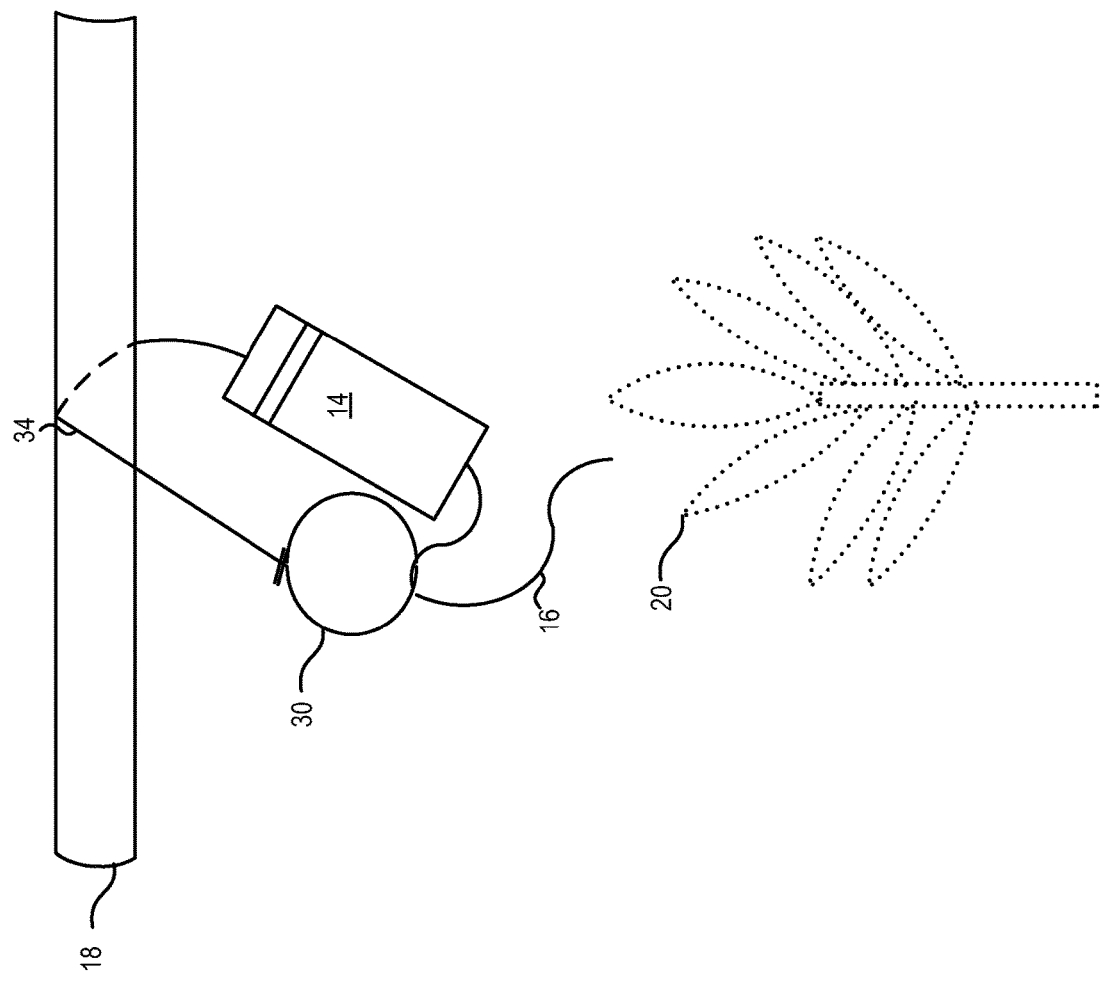

Various example arrangements of the loop 30 and tail 34 are illustrated in FIGS. 3A-D. As shown in FIG. 3A, loop 30 and tail 34 may be configured to hang over support element 18. In some embodiments, the diameter of the loop may be configured to be smaller than the diameter of the support element. In such embodiments, the loop 30 and tail 34 may be hung over the support element 18. The contact lead segment 16 is shown hanging from engagement section 14. In one example, the user feeds the contact lead segment 16 through the loop element and then continues to feed the engagement section through the loop element. After the engagement element, the contact lead segment and the tail are fed through the loop such that the trap may be hung from the support. The contact lead segment may be engaged with the plant after suspension of the trap. It should be noted that in some embodiments, the contact lead segment may be prewrapped or engaged with the plant prior to suspension of the trap.

In some embodiments, as illustrated in FIG. 3B, the contact lead segment 16 may be configured to pass through the loop prior to engagement of plant 20. Such configuration may include the advantage of being able to utilize any existing pole or shaft near the plant. Additionally, such configuration allows securing the loop in place.

Figure 3C:
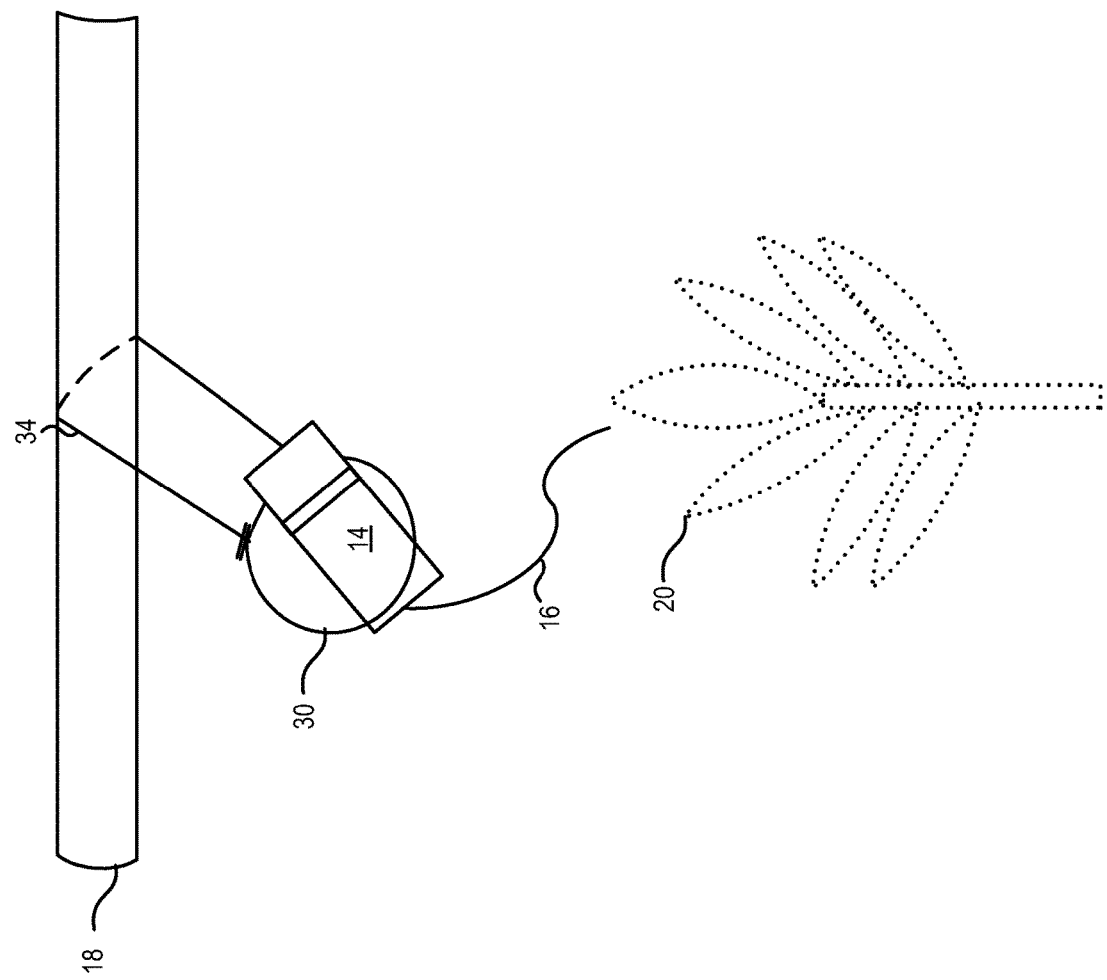

In other embodiments, as illustrated in FIG. 3C, engagement section 14 may be configured to pass through the loop. Such embodiments, include the advantage of securing the loop in position. Insertion of the engagement section into the loop may operate to help secure the loop and the suspension element.

Figure 3D:
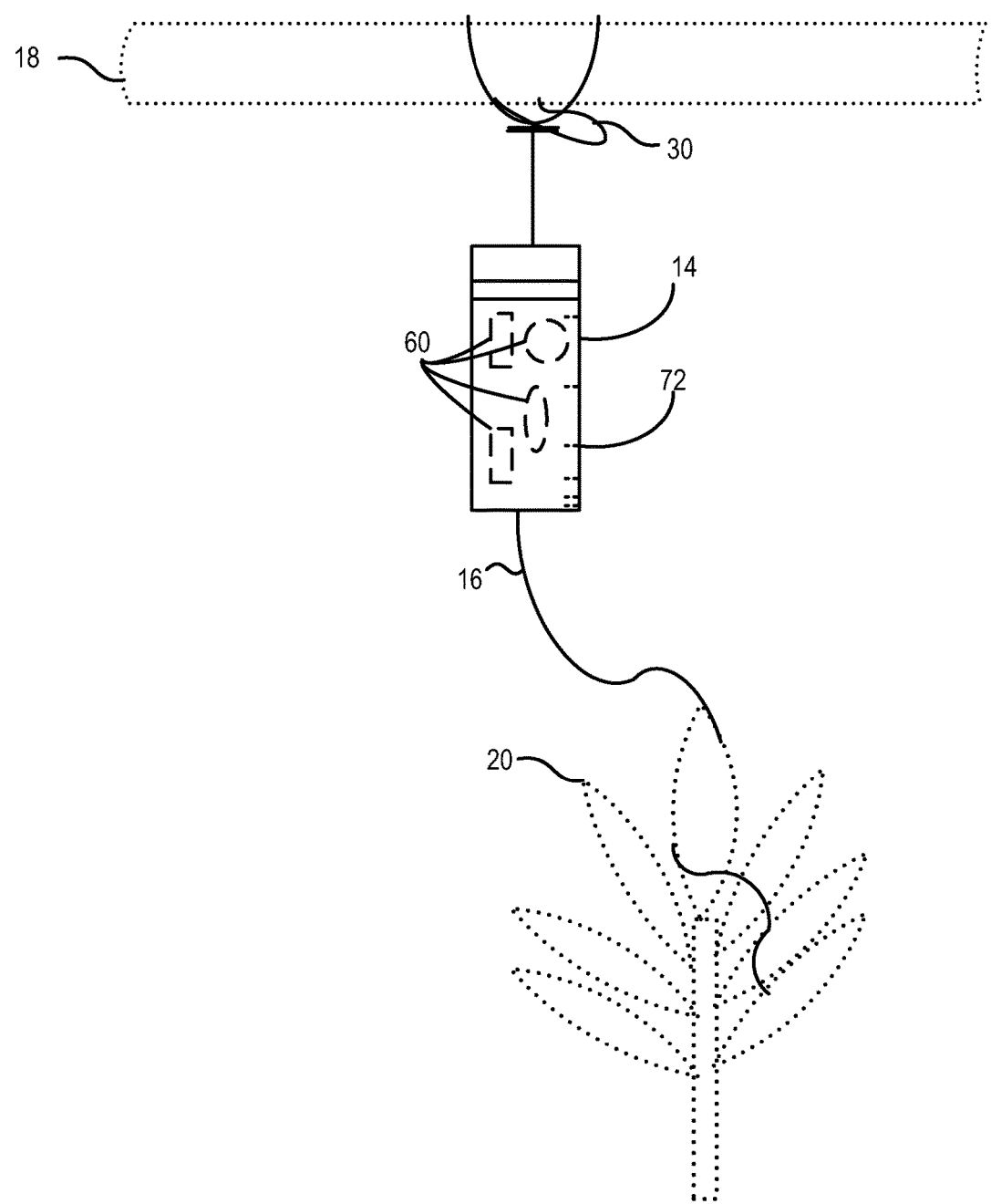

In another embodiment, as shown in FIG. 3D, additional securing of the loop may be achieved by passing the head end of the loop through the eye of the loop. Thereby securing the loop to the support element. The contact lead segment may be wrapped or disposed on plant 20 to form the pest pathway from the plant to the trap, typically formed after suspension of the trap.

Each of the above described embodiments are example illustrations of configurations to secure and position the pest trapping device in position. The configuration may depend on the crop. For example, in outdoor environments, an extended string or wire may extend across a row of plants, such as maize plants. The pest trapping device may be secured using the loop or otherwise tying or looping the pest trapping device in position. In other examples, a fixed suspension element, such as a bar may extend over crops, such as crops grown in green-houses or in other controlled environments. Again, any suitable configuration, including the loop ties described herein, may be used to secure the pest trapping device in position suspended above the crops. The above configurations are provided by way of example and are not intended as a limitation.

Figure 4:
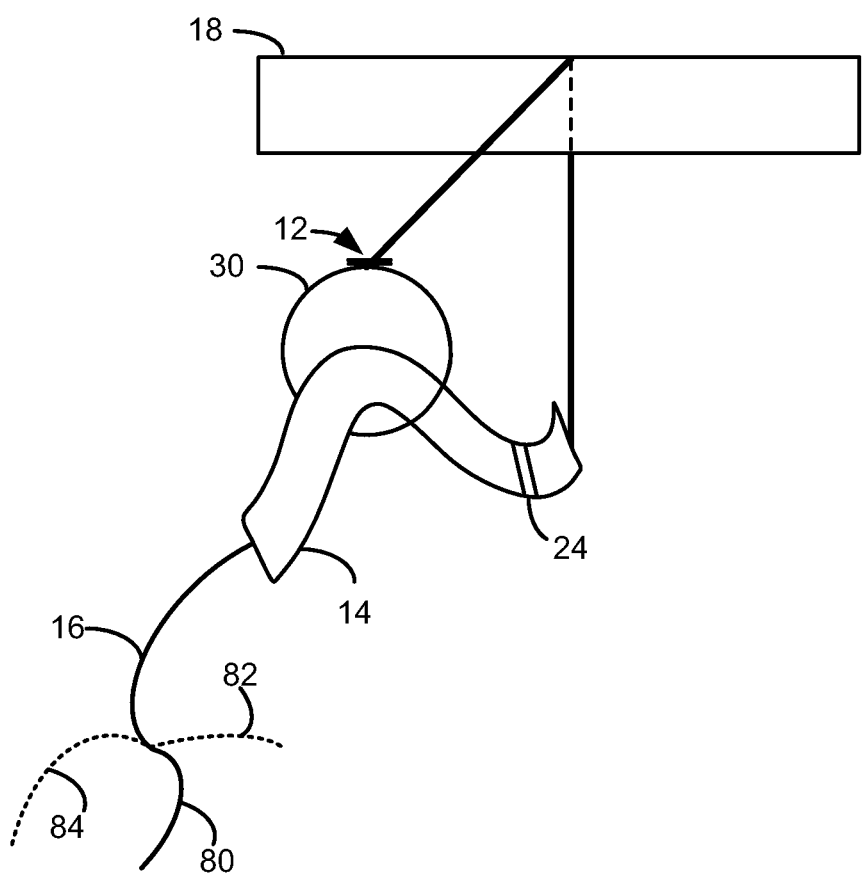
FIG. 4 illustrates an example of suspending the pest trap from a support element.

Referring back to FIGS. 2A-C, in an example embodiment, the engagement section 14 may include a pest trapping element 43, wherein the trapping element 43 may include a first engagement element 40 and the second engagement element 42, such as shown in FIG. 2B. The engagement elements 40, 42 may include a pair of cards. It should be appreciated that other engagement elements are considered and are within the scope of the disclosure. For example, and not as a limitation, single-sided tape may be utilized or double-sided tape may be applied or used in combination with, as part of or in place of the pair of cards. In one example, the engagement elements may be flexible as shown in FIG. 4. The engagement elements may be flexed to pass through loop 30 to allow suspension from the support element 18. In another example, the engagement elements may not be flexible but may be passed through the loop 30 to enable suspension from the support element 18.

FIG. 4 further illustrates contact lead segment 16. As shown, contact lead segment 16 may hang loosely until after suspension of the trap. In some examples, contact lead segment may include a primary pathway, indicated at 80. In other examples, contact lead segment may include one or more additional pathways, such as illustrated at 82, 84. Any number of pathways may be used to provide a pathway to engagement section 14. Further, although shown with a single contact lead segment 16, it should be appreciated that one or more contact lead segments may be utilized and provide a direct path to the engagement section 14.

Figure 5:
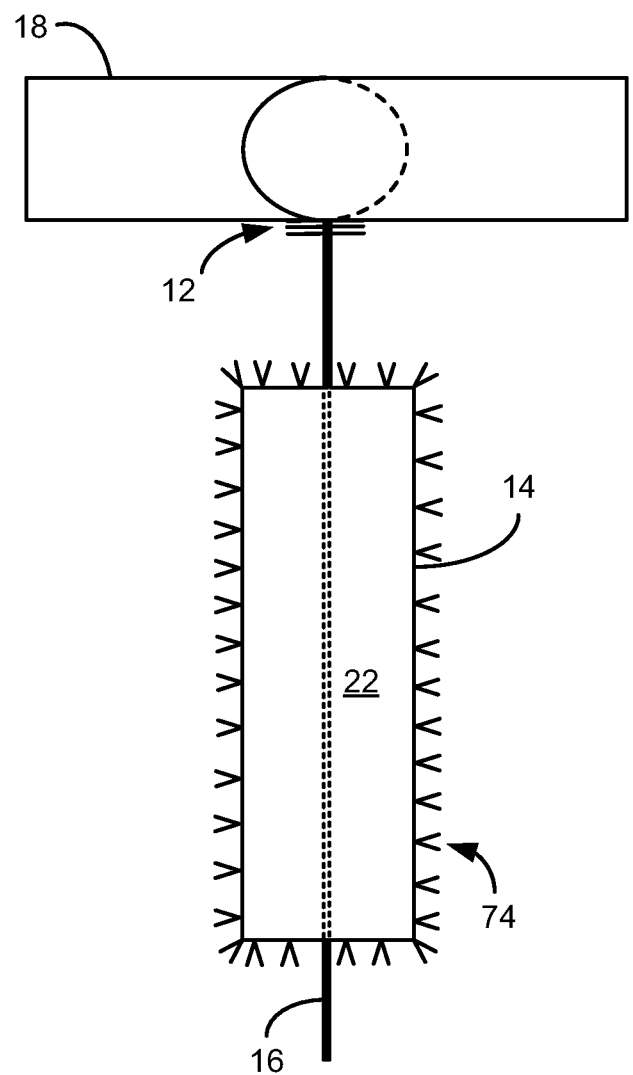
FIG. 5 illustrates a further example of a pest trapping device of the present disclosure.

Engagement elements 40, 42 may be configured to be of equal length and width. In some examples, the length of the pair of engagement elements 40 and 42 may range between 4-8 inches, while the width of the engagement elements 40 and 42 may range between 1.5-4 inches. These ranges are provided for example purposes and are not intended as a limitation. The size of the engagement section may be varied depending on plant, arthropod type and application. Further, although illustrated as having two engagement elements, it should be appreciated that the pest trapping element may be a single-sided card or may be a 3-D shape or other suitable configuration without departing from the scope of the disclosure. Further, the trapping element may be partially or fully covered with a pest immobilization surface. For example, mucilage may be applied to all corners, faces and edges of the exterior surface of the trapping element as indicated by a carat 74 in FIG. 5. In another example, mucilage may be applied to only some of the edges, faces and corners, such as, but not limited to an application to the sides but not the top and bottom edges of the trapping element. In yet another example, mucilage may completely cover the trapping element. Further, patterns may be formed with the mucilage along one or more of the edges, faces and corners to generate an enhanced fill path.

In the illustrated embodiment, the first engagement element 40 may include a first side and a second side. Similarly, the second engagement element 42 may include a first side and second side. The first side of each element may be considered as the pest contact side and the second side may be considered a backing side. The pest contact side of each engagement element may be positioned externally while the backing sides may be positioned such that the engagement elements are coupled together. The backing sides form the internal surface of the engagement section.

Figure 2B:
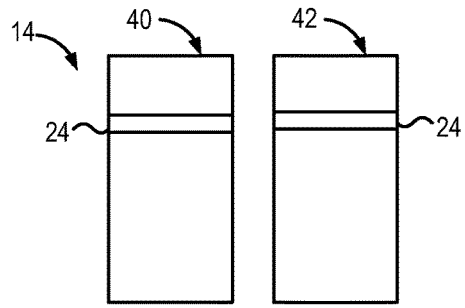
FIG. 2B illustrates a pair of engagement elements.
Figure 2C:
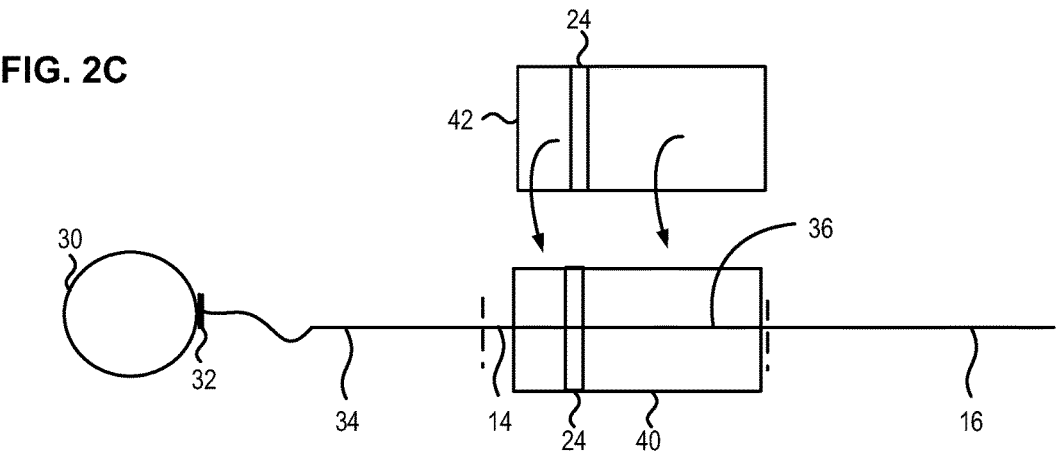
FIG. 2C illustrates assembly of an example engagement section of the present invention.

As illustrated in FIG. 2C, in one example, to assemble the pest trapping device 10, the first engagement element 40 may be positioned such that the backing side engages the extension 36 of tail 34. The backing side may include a coupling adhesive, such as glue to engage the backing side of the second engagement element 42. Extension 36 may be positioned to enable the contact lead segment 16 to extend outward from the end of engagement section 14.

To form the pest immobilization surface, an adhesive or contact substance may be applied to the pest contact side of the first and second engagement elements. In some examples, the contact substance may be a mucilage, such as, but not limited to organic, visibly transparent, plant-based extracts, such as a botanical mucilage. Non-limiting examples of such botanical mucilage may include a combination of carnauba wax, castor oil, different variants of copal, and other such adhesives (e.g. TREE TANGLEFOOT INSECT BARRIER). For example, the mucilage may include a combination of caranauba wax, castor oils and copals. The viscous, non-drying nature of castor oil in combination with adhesive nature of copals may provide suitable immobilization contact surface for retaining minute pests, such as spider mites. A single type of adhesive may be applied in some examples, while in other examples one or more different types of adhesives, either in combination or applied to different sections, may form the pest immobilization surface.

The adhesive may further comprise or consist of other materials, including various grades of polybutenes, hydrogenated polybutenes and other adhesives. Specific grades of hydrogenated polybutenes may be used depending on the desired adhesiveness for the contact surface. In one example, products, such as TREE TANGLE-TRAP ARACHNID TRAP COATING, may be used. For example, the product may include polybutenes, molecular weight greater than 2500 and hydrogenated castor oil. It should be appreciated that pesticides and/or other adhesives, such as the mucilage described above may be used in combination with such materials. Further, pesticides and chemical lures may be applied to other portions of the trap, including but not limited to the suspension element, any suitable section of the engagement section, and/or the contact lead segment.

The pest immobilization surface also results in attachment of any eggs to the engagement section. For example, upon reaching the engagement portion, spider mites are held fast until the end of their life cycle. Any eggs laid by an adult while it is held in the engagement portion of the trap remain in the trap until they hatch (three days after being laid) at which time the newly hatched protonymph becomes fatally mired in the mucilage of the engagement section of the trap.

Figure 2D:
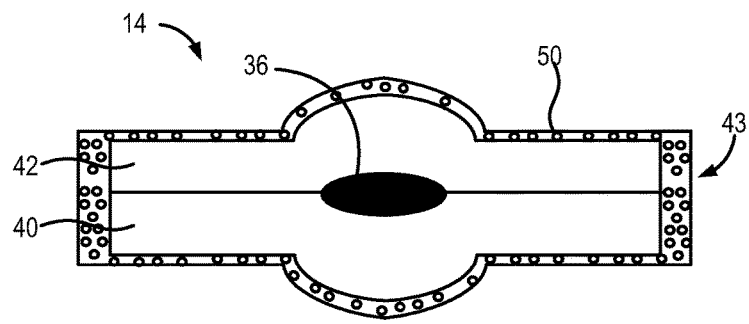
FIG. 2D is a cross-sectional view of the engagement section.

FIG. 2D illustrates a cross-sectional view of engagement elements 40 with extension 36 passing through the center. The contact substance 50 may extend on the pest contact sides of each engagement element. As noted above, the contact substance may be a plant-based mucilage which may be applied prior to adherence of the engagement elements or after adherence of the engagement elements.

The contact substance may be formed from an individual plant or a combination of mucilage from different plants. The contact substance may be a non-drying, sticky, adhesive substance. Upon interaction with the contact substance on the engagement elements, pests may adhere and become immobilized on the engagement section. The non-drying nature of the adhesive substance is advantageous in retaining the pests. Drying of the adhesive substance may allow the pests to more easily move past the pest immobilization surface.

Organic composition of the contact substance allows for biodegradability and environmental safety. Use of biodegradable mucilage may be preferred in some embodiments to avoid detrimental effects on the environment or on humans. Although biodegradable mucilage may be used in some embodiments, other embodiments may utilize a non-biodegradable mucilage. Further, mucilage comprising the contact substance may be viscous in nature. Viscosity of the contact substance alters the crawling surface such that the surface is sticky or tacky, greatly impeding crawling motion of minute, crawling pests.

In some examples, the use of mucilage may prevent the necessity of high levels of miticides or pesticides and may avoid concerns which are raised in regards to conventional miticides or pesticides being harmful to the environment, the plants, and concerns regarding the long term health hazards in humans and animals.

In other example embodiments, it should be appreciated that in addition to the mucilage, or instead of the mucilage, pesticides or other chemicals may be added to enhance the operation of the pest trapping device. Such pesticides or other chemicals may be used to increase the useable life of the pest immobilization surface. In other examples, the pesticides and chemicals may be used to further increase the trapping of pests. Such pesticides and chemicals may be applied to the engagement section and/or the suspension element. Further, in some examples attractants may be used to attract pests along the contact lead segment or the engagement section.

Extending from the engagement section is contact lead segment 16. Contact lead segment 16 may be configured to be devoid of the contact substance 50 as coating the contact lead segment with the contact substance would result in early piling of pests on the contact lead segment which would impede the upward movement of pests onto the engagement section. Early piling may further be controlled by removal of the entrapped population of pests entirely from the plant's surface by disposal of one or more parts of the trap where the early piling has accumulated, including, but not limited to removal, replacement or disposal of the contact lead segment and/or the engagement section. In other examples, the trap may be replaced. Control of early piling avoids the hazard of reintroduction of trapped pests to the host plant which may result when a mode of escape is opened due to early piling.

Referring briefly back to FIG. 1 and as shown in part in FIGS. 2B and 2C, an indicator mark 24 may be provided on one or more of the engagement elements. More generally, the indicator mark may be positioned on the engagement elements to provide indication of pest fill level or number of pests localized on the engagement elements. In some embodiments, one or more additional indicator marks may be applied, such as graduated markings which may be used to estimate the number of pests at a certain level as the engagement element becomes more filled with pests. The indicator mark may be a line, a band, a strip, or such other mark. The indicator mark may be a colored line or a colored band, such as a red line or a red band. The indicator mark may be drawn or printed on the pair of engagement elements or on a single engagement element. Further, although shown as a line or band, the indicator mark may be any differentiating mark and may only partially extend along one or more sides of the engagement section.

As noted above, the indicator mark may be configured to indicate the level of accumulated crawling pests. For example, as pests continue to crawl up the contact lead segment and start accumulating on the engagement elements, the indicator mark may be indicative of the fill. For example, successive graduated marks may be covered with accumulated pests. In some embodiments, the indicator mark may be a red line. In the process of being loaded with crawling arthropods, the red line may start to become covered with pest corpses. In some examples, the red line may appear to disappear. Coverage or partial coverage of the indicator mark may provide notification to a user that the engagement section is filled with pests and replacement is recommended for effective use of the pest trapping device. Further, in some examples, as the pest load of the trap increases, the trap turns greyish from the bottom of the engagement portion, moving upwards; this graying of the engagement portion are the amassed remains of trapped pests. The user may use this graying or other color differentiator to determine fill level.

In some embodiments, the indicator mark may include graduated markings (indicated at 70 in FIG. 1). The graduated markings may be linear measurements or non-linear measurements. For example, the graduated markings may be evenly spaced such as to indicate conventional measurements, such as imperial measurements, (e.g. an inch or portions thereof) or similar metric measurements, (e.g. millimeters, centimeters or portions thereof). Further, in other examples, the graduated markings may be unrelated to conventional measurements and may indicate a pre-selected level or graduated level which may be used to estimate the level of pest infestation. In some embodiments, the graduated markings may be unevenly or non-uniformly spaced (indicated at 72 in FIG. 3D) to correlate to the level of pest infestation more directly. For example, the markings may be utilized by growers to estimate pest level. The grower may identify certain areas in the plantation as highly infested with pests based on the rate of pest accumulation and/or pest level indicated by the indicator mark. Such observation may help the grower decide to include additional pest trapping device or devices in such areas. It should be appreciated that these graduated markings may be in addition to or inclusive of the fill-indicator mark 24.

Although the illustrated graduated markings are shown as line indicators, it should be appreciated that the graduated markings may be bands or other suitable marking. For example, the graduated markings may be different colored bands and such bands may be of uniform width or may vary without departing from the scope of the disclosure.

In some examples, one or more of the indicator marks may be positioned above a vertical centerline of the engagement elements as the pests fill the engagement section from bottom to top. In some examples, one or more of the indicator marks may be positioned in close proximity to the top edge of the engagement section.

In one example embodiment, an indicator mark may be positioned, for example, 0.5-1 inches from upper end of the first and second cards and the thickness of the indicator band may be configured to range between 5-6 mm. It should be appreciated that the position of the indicator mark may be varied outside this range without departing from the scope of the disclosure.

The indicator marks include the advantage of promptly helping the user identify which of the pest trapping devices are loaded with pests. Crawling pests, such as spider mites, typically have a color of their own, ranging from red and brown to yellow and green, depending on the species of spider mite and seasonal changes and other factors. However, individual spider mites are invisible to the naked eye, therefore in spite of their colored appearance, their presence cannot be ascertained. With such minute arthropods, a color indicator may be used. Change in color of the indicator mark due to accumulation of spider mites, suggests time for replacement of the engagement section and/or the pest trapping device.

In some examples, a plurality of indicator marks may be applied to the engagement section. For example, varying colored bands may be used to provide information on the pest load level on the engagement section. The coloration of the bands may vary as the pest load is increased on the engagement section. Initially as the pests accumulate, due to the small size of the arthropods, there is no change in color of the indicator mark. However, with accumulation of pests the color of the indicator mark begins to change depending on the color of the pests. For example, the indicator mark may be blue in color, but with increased accumulation of red-colored two-spotted spider mites, the blue color of the indicator mark begins to appear darker or appear red.

Further, in some examples, opening(s) or vents 60 (as indicated in FIG. 3D) may be provided in the engagement elements. The openings may allow for the engagement section to maintain substantial stability in wind or venting conditions and any suitable size or number of such openings may be applied depending on the configuration of the engagement section. Similarly, although the shape of the venting of the engagement section is shown as an extended rectangle and/or ellipse other shapes are considered and are within the scope of the disclosure. Other non-limiting shapes may include, circles, regular and/or irregular polygons, ovals, rhombus and such others.

As described above, the pest trap, system and method operates to trap small, flightless arthropod pests, like spider mites, at all stages in the animal's life cycle including egg-stage. In some examples, the trap and system may operate without the use of toxic chemicals, pheromones or other scent lures, pesticides, soaps or oils and without having to introduce predator species. In other examples, select chemical lures and pesticides may also be included as part of the trap and system.

As described above, the pest trapping device may include a number of elements, including, but not limited to a suspension element, an engagement section and a contact lead segment. In some examples, the pest trapping device may be provided in the form of a kit where a user may assemble the pest trapping device for use. For example, an pest trapping device kit may be provided wherein the kit may include a string, a pair of cards, such as described in regards to engagement elements 40 and 42 (indicated in FIG. 2B) and mucilage. Instructions may be provided for assembly. In the example kit, the string may include a loop, such as the loop 30 or the user may tie a loop or other element to the suspension element. The pair of cards may include an adhesive side and a non-adhesive side. The adhesive side may include a cover for the adhesive surface and/or the user may apply an adhesive. In one example, the user may assemble the pest trapping device by peeling off the cover from the adhesive side of one of the cards and placing one of the cards with the adhesive side facing up. The string may then be placed at the center of the adhesive side of the card facing up. The other card may then be placed on the adhesive sealing the string between the cards. The string extending downward from the cards may be considered the contact lead segment while the string extending upward from the cards may be considered the suspension element. The mucilage may be applied to the exterior surface of the cards.

In some example kits, the cards may be configured with a hanging device or other attachment for a hanger. Further, the contact lead segment may be pre-connected or attached to the cards. Such configurations do not depart from the scope of the disclosure.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and sub combinations of the various features, functions, acts, and/or properties disclosed herein, as well as any and all equivalents thereof.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An arthropod trapping device, comprising:
    a suspension element;
    an engagement section including an extension that extends from the suspension element, the engagement section further including engagement elements coupled to the extension, wherein the engagement elements have a pest immobilization surface, the pest immobilization surface formed via a sticky contact substance on the engagement elements, the pest immobilization surface including a fill indicator mark near a first end of the pest immobilization surface, wherein the engagement elements include a first card and a second card, wherein externally facing surfaces of the first card and externally facing surfaces of the second card have the sticky contact substance to form the pest immobilization surface, and wherein an internally facing side of the first card is coupled to an internally facing side of the second card via a coupling adhesive, wherein the extension is engaged with the internally facing side of the first card, wherein the sticky contact substance is a botanical mucilage, and wherein all corners, faces, and edges of the externally facing surfaces of the first card and the second card have the botanical mucilage; and
    a contact lead segment formed from fibers and extending from the extension near a second end of the pest immobilization surface, where the second end of the pest immobilization surface is opposite the first end of the pest immobilization surface, the contact lead segment comprising a first end and a second end, where only the first end of the contact lead segment is adjacent the pest immobilization surface, where the contact lead segment is devoid of the sticky contact substance, where the contact lead segment forms a pest pathway to the pest immobilization surface, and where the fill indicator mark indicates a fill level of the pest immobilization surface as the engagement section is filled from the second end to the first end, and
    wherein the suspension element, the extension, and the contact lead segment are a continuous fiber.

2. The trapping device of claim 1, wherein the fill indicator the second end of the contact lead segment is a free end that is detached from the pest immobilization surface, and wherein the engagement elements are positioned between the contact lead segment and the suspension element.

3. The trapping device of claim 1, wherein the fill indicator mark comprises a straight line that extends across an entire width of the pest immobilization surface, the fill indicator mark positioned above a vertical centerline of the pest immobilization surface.

4. The trapping device of claim 1, wherein the pest immobilization surface further comprises graduated markings, the graduated markings positioned between the fill indicator mark and the second end of the pest immobilization surface, and wherein the graduated markings are evenly spaced.

5. The trapping device of claim 4, wherein the engagement elements are flexible.

6. The trapping device of claim 1,
    wherein the second end of the contact lead segment is configured to fold into a plant.

7. The trapping device of claim 1, wherein the contact lead segment has a chemical lure.

8. The trapping device of claim 1, wherein the suspension element includes a loop secured with a non-slip knot.

9. The trapping device of claim 1, wherein the sticky contact substance is a viscous, non-drying contact substance.

* * * * *